United States Patent [19]

Landell et al.

[11] Patent Number: 4,691,470

[45] Date of Patent: Sep. 8, 1987

[54] LIGHTED TACKLE BOX

[75] Inventors: Harper Landell, Downington; Richard G. Woolworth, Lancaster, both of Pa.

[73] Assignee: Woodstream Corporation, Lititz, Pa.

[21] Appl. No.: 861,825

[22] Filed: May 12, 1986

[51] Int. Cl.$^4$ ............................................ A01K 97/04
[52] U.S. Cl. ................................................. 43/55; 362/191
[58] Field of Search ..................... 43/54.1, 55, 17.5; 200/318, 333; 362/155, 154, 156, 191; 206/315.11

[56] References Cited

U.S. PATENT DOCUMENTS

| | | | |
|---|---|---|---|
| 1,269,836 | 6/1918 | Moehn | 362/155 |
| 1,746,810 | 2/1930 | Anderson | 362/155 |
| 2,156,443 | 5/1939 | Zook | 362/191 |
| 2,156,946 | 5/1939 | Closson et al. | 200/318 |
| 2,517,914 | 9/1950 | Nowaczik | 362/155 |
| 2,751,489 | 6/1956 | Cole | 43/54.1 |
| 2,851,585 | 10/1958 | Glowzinski | 362/155 |
| 3,134,383 | 5/1964 | Thompson | 362/155 |
| 3,346,733 | 10/1967 | Woolworth | 240/6.4 |
| 4,540,858 | 9/1985 | Knoop | 200/333 |

Primary Examiner—Nicholas P. Godici
Assistant Examiner—Karen Skillman
Attorney, Agent, or Firm—Holman & Stern

[57] ABSTRACT

A tackle box has superposed interlinked trays which are stacked inside of the box when it is closed and which are moved into a staggered opened out configuration by cantilever linkages when the box is opened. The trays are made of a clear plastic material capable of transmitting light by edge lighting. The uppermost and lowermost trays have central compartments receiving respective self-contained flashlight-type light fittings each with a light bulb received in a socket formed in the base wall of the respective tray. When activated, the respective light bulbs light the respective trays be edge lighting. The light fittings have plunger-type switches projecting upwardly for actuation by the tackle box lid and the intermediate tray respectively so that the lighting system is automatically actuated when the box is opened. The switches can be permanently positioned in an off condition for daylight use. The light fittings may be removed for independent use as flashlights.

14 Claims, 7 Drawing Figures

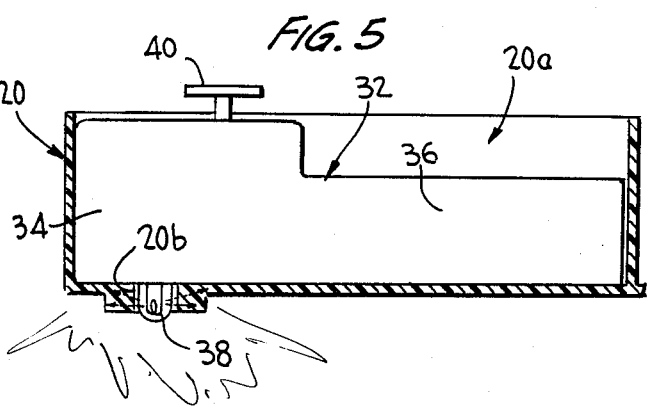
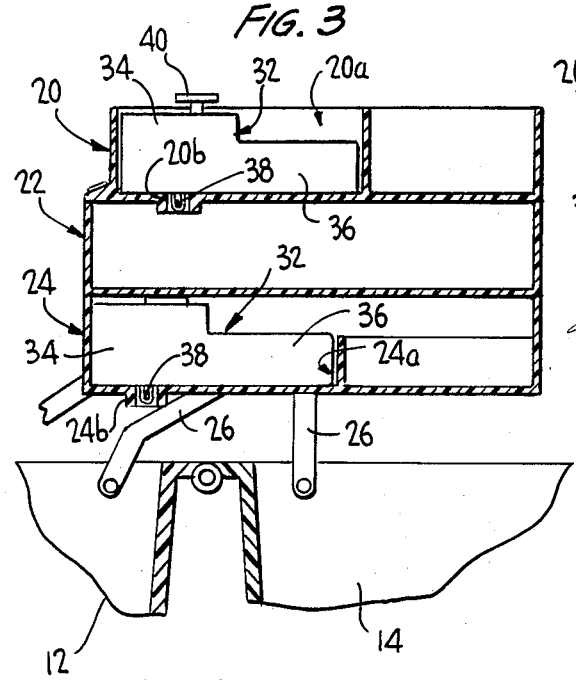
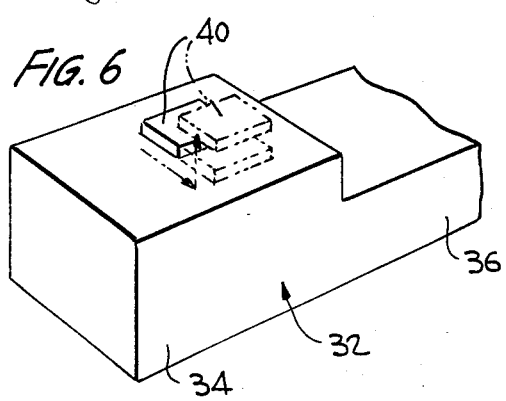
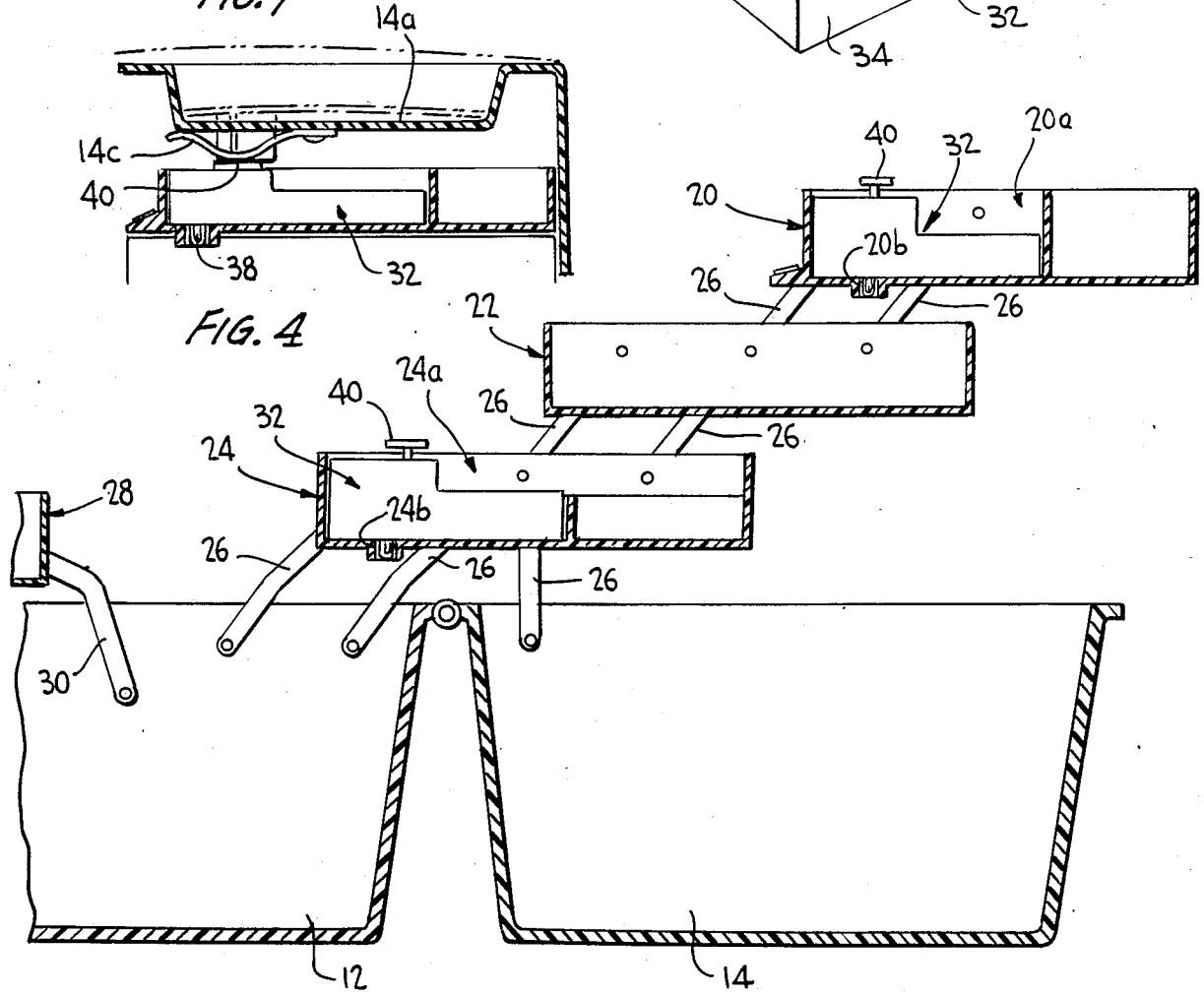

LIGHTED TACKLE BOX

BACKGROUND OF THE INVENTION

This invention relates to portable lighted containers such as tackle boxes, tool boxes, medical boxes, first aid kits, and the like which include at least one compartmented tray.

One well known form of tackle box, for example, comprises an open topped base member with a hinged lid, or multiple hinged lid segments, and a plurality of compartmentalized trays contained within the base member when the lid is closed, with linkage elements interconnecting the trays so that they can be moved from a superimposed stacked condition when the box is closed to an expanded cantilevered condition in which the trays are vertically offset whereby access can be obtained to each tray when the box is opened. While this form of tackle box structure may provide ready access to each tray when the box is opened, generally no provision is made for lighting the trays, for example, as an aid to nocturnal fishing.

An earlier proposal for lighting a tackle box of the above type is disclosed, for example, in U.S. Pat. No. 3,346,733, issued Oct. 10, 1967 to Woolworth. In this arrangement, a pair of the superposed tackle box trays are formed with light sockets for receiving respective light bulbs which are positioned in plane with the base of the respective tray. The trays are made of a material which transmits light by an edge-lighting effect (sometimes referred to as a light piping effect) so that when the box is opened and the trays are moved into the cantilevered positions, the respective light bulbs are actuated and the trays are caused to glow by the edge lighting effect. Further, one of the light bulbs is located in the lowermost tray of the stack so that it also serves to light the bottom of the box.

In the tackle box structure disclosed in the Woolworth patent, the light bulbs in the respective trays are operated from a battery pack which is contained in a housing located at one side in the base of the box. Further, circuitry for actuating the light bulbs extends from the power pack through the metal links which interconnect the respective trays and thence by leads to the respective light sockets. The system is somewhat complex, thereby adding to the expense of the tackle box and, moreover, the power pack impinges upon the space available in the base of the box.

SUMMARY OF THE INVENTION

It is an object of the present invention to provide a lighting system for incorporation in a lidded container such as a tackle box, tool box, medical kit, or the like, whereby the box interior may be lit, preferably on a selectively automatic basis, when the lid of the box or a lid segment of the box is opened.

It is a further object of the invention to provide a lighted tackle box having a somewhat simplified and more economic lighting system for the box interior, than the system disclosed in the above noted Woolworth patent.

Another object of the invention is to provide a lighting system for use in a container as aforesaid which incorporates a lighting fitting that can be removed from the container for independent use as a flashlight, for example.

A further object of the invention is to provide a lighting system for a tackle box or the like which impinges to a minimal extent on the space available within the box while providing optimal lighting for the interior thereof.

In at least partial fulfillment of the above and other objects, the invention provides, in one of its aspects, a portable lidded container such as a tackle box or the like having at least one internal compartmentalized tray which may be made of a plastic material capable of transmitting light therethrough by edge lighting, a self-contained, battery-operated lighting fitting associated with the tray, the fitting having a light bulb located in plane with a base wall of the tray for lighting the tray, inter alia, by edge lighting, with a hole through the tray so that light is projected downwardly, a plunger-type switch projecting from an upper surface of the lighting fitting, and a switch actuator on an element of the container above the tray for depressing the switch when the box is closed so as to deactivate the light bulb and for releasing the switch when the container is opened so as to activate the light bulb.

The lighting fitting preferably is in the form of a self-contained flashlight adapted to fit in a compartment of the aforesaid tray which is provided with a light bulb opening and socket in the base thereof so as to provide light through the opening, and, if desired, the edge lighting effect. As required, the lighting fitting may be removed from the tray compartment for independent use as a flashlight. For example, the lighting fitting may use a pair of size AA batteries (or other conventional small batteries) therein for actuating the light bulb through conventional flashlight circuitry. The plunger-type switch may be provided on an enlarged portion of the lighting fitting projecting from a surface opposite a surface from which the bulf projects. Further, the plunger switch may have a laterally depressed position in which it is locked in a mode deactivating the light bulb so that, for example, during daylight use of the container the switch will not be released to activate the light bulb when the container is opened.

Lighting fittings in accordance with the invention may, for example, be provided in the topmost tray of a superposed stack of tackle box trays for actuation by a switch actuator associated with a lid or lid element of the box. Additionally, or alternatively, a further lighting fitting in accordance with the invention may be provided in all of the trays of a multiple tray box or, at least, in the lowermost tray of the stack for actuation of its switch by the tray thereabove as it slides over the switch when the box is opened and closed. The lighting fitting in the lowermost tray is thereby adapted not only for lighting the tray itself but also for lighting the interior of the base of the box.

In accordance with a further feature of the invention for a lighting fitting received in the uppermost tray, the switch actuator in the lid or lid element of the box may comprise a bent spring designed to maintain pressure on the switch when the box is closed, even if the lid is distorted upwardly, for example, if the box is lifted when heavily loaded so that the switch will not be released and activate the light bulb in these circumstances.

Additional features and advantages of the invention will become apparent from the following description and claims read in conjunction with the accompanying drawings.

BRIEF DESCRIPTION OF THE DRAWINGS

FIG. 3 is an enlarged sectional elevational view of a tray structure of the tackle box prior to opening out of the trays;

FIG. 4 is a view similar to that of FIG. 3 showing the tray structure when opened out into cantilever configuration;

FIG. 5 is a further enlarged sectional view of a tray compartment showing a removable lighting fitting positioned therein;

FIG. 6 is a perspective view of a forward part of the lighting fitting; and

FIG. 7 is a sectional elevational view through a part of a tackle box lid showing a preferred form of switch actuator for the lighting fitting.

DESCRIPTION OF THE PREFERRED EMBODIMENT

Figure 1:
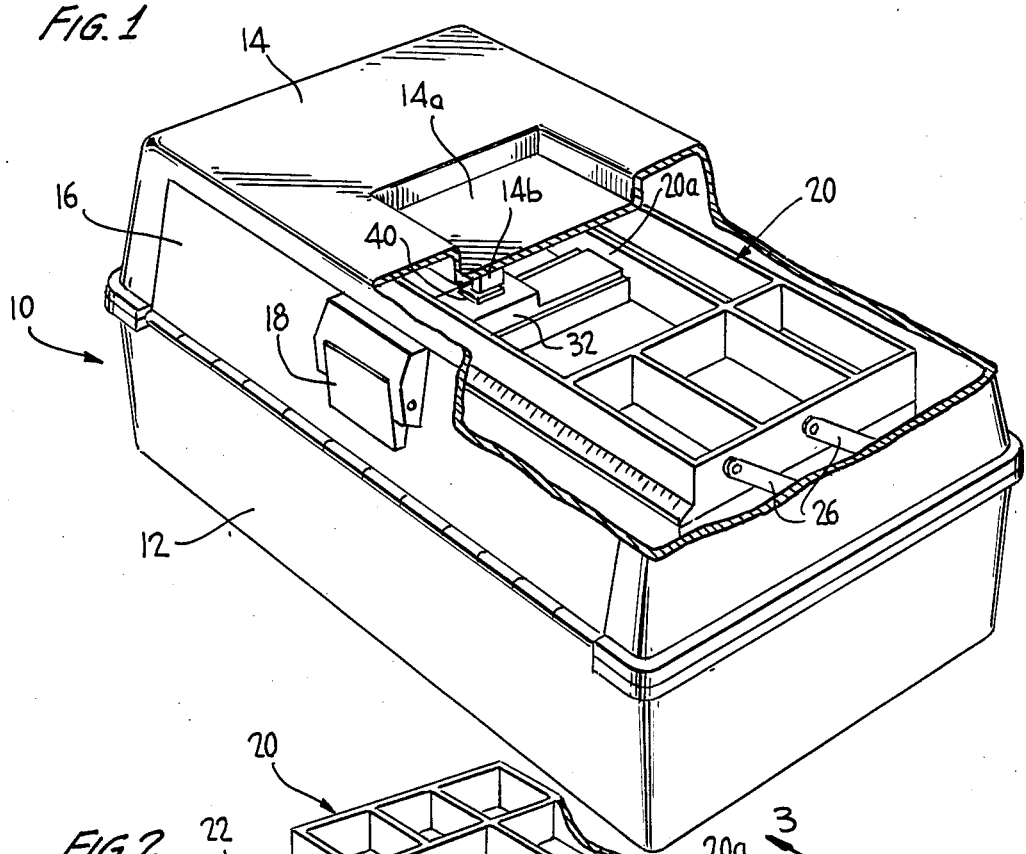
FIG. 1 is a perspective view of a tackle box in accordance with the invention, part broken away to reveal its interior structure, the tackle box being shown in a closed condition.

The basic features of the instant invention may be used in containers of various forms and made of various materials. For example, as indicated, the lighting construction is particularly useful in association with a tackle box or the like having a multiplicity of cantilevered trays of light transmitting plastic. However, in a broader sense, the trays may be of an opaque material with the light receiving opening functioning to transmit light downwardly to illuminate the space therebelow. The box can include a single tray or a multiplicity of trays which can be automatically cantilevered outwardly on opening the lid or which may be manually movable. In such an arrangement one, some or all of the trays may be fitted with a lighting system according to this invention. The box itself can be formed of any material such as metal or plastic and can have a front panel hinged to the bottom with a latch thereon to secure the lid or can be a more conventional lidded box with complementary latch sections on the bottom and lid. The following detailed description makes reference to a particularly preferred device as shown in the drawings, but it is to be understood that this disclosure is illustrative and not to be limiting on the broader concepts of this invention.

A tackle box 10 has a molded plastic box-like base member 12, a molded plastic box-like lid member 14 hinged to the rear of the base member, and a front panel 16 hinged to the front of the base member, the front panel carrying a latch device 18 for cooperating with a complementary catch (not shown) on the lid member to retain the tackle box in a closed condition.

Internally, the tackle box includes a set of nesting compartmentalized trays 20, 22, 24, each molded in a clear plastic material, the trays being interconnected, in known manner, at each side by metal linkages 26 which also connect the set of trays to the side walls of base member 12 and lid member 14. The particular construction of the linkage members is well known in tackle boxes of this type and will not be described herein in detail. The arrangement is such that when lid member 14 is closed, the linkages 26 locate the trays 20, 22, 24 in a superposed stacked condition within base member 12, but when the lid member is opened, the trays are moved by the linkages up and out of the base member to the position shown in FIG. 2 wherein the trays are still superposed one above the other but removed from the base member. The stacked trays may then be moved manually to the cantilevered opened out position shown in FIG. 4 by pulling rearwardly on topmost tray 20.

The tackle box further includes a single tray 28, which when the box is closed is situated beneath tray 24, tray 28 having pivoted metal links 30 connecting same to base member 12 so that when the box is opened, tray 28 can also be manually withdrawn from the base member 12 by pivoting on links 30 in known manner. At least trays 20, 22, 24 are molded in a clear plastic of a type which is capable of transmitting light by an edge lighting or light piping effect, having "glass rods" or "optic fibers" for longitudinal transmission of light along the respective trays. An example of material of this type is given at the top of Column 3 of the aforenoted patent to Woolworth, the entire disclosure of which is expressly incorporated herein by reference Trays 20 and 24 have respective centralized compartments 20a, 24a each of which is shaped and sized to receive respective self-contained flashlight-type lighting fittings 32. In the described embodiment, the lighting fittings are identical and are accordingly referred to by the same numeral 32. Each lighting fitting 32 comprises an openable plastic housing of generally elongate form with an enlarged head end 34 and a narrow tail end 36. Projecting from a lower surface of head end 34 is a light bulb 38 and projecting from the upper surface of head end 34 is a plunger-type operating switch 40. Internally, each lighting fitting 32 may contain a pair of AA batteries (located in tail portion 36) and suitable circuitry for activating light bulb 38 via switch 40 in such a manner that when the switch is depressed, the light bulb is deactivated and when the switch is released, it springs upwardly and the light bulb is activated. Further, as illustrated in FIG. 6, the switch may have a laterally displaced position in which it can be locked in the depressed state so that the light bulb will remain deactivated.

The interanl construction and circuitry for the respective lighting fittings 32 may follow conventional flashlight practice and does not form part of the present invention. Suffice it to say that the overall length of each lighting fitting 32 may be about three and one-half (3½) to four (4) inches, its width about one inch and a quarter (1¼), the height of the head section about one (1) inch, and the height of the tail section about three-quarters (¾) of an inch, making the respective fittings readily suitable for independent use, as hand held flashlights when removed from their respective compartments 20a and 24a.

As previously noted, the respective tray compartments 20a and 24a preferably are sized and shaped snugly to receive the respective lighting fittings 32. Further, in the base wall of the respective compartments, there are formed apertured sockets 20b, 24b for receiving bulbs 38 of the respective lighting fittings in plane with the base walls of the respective trays. Accordingly, it will be evident that when the respective light bulbs are activated by upward release of the respective plunger switches 40, trays 20 and 24 will be caused to glow by an edge lighting effect.

Figure 2:
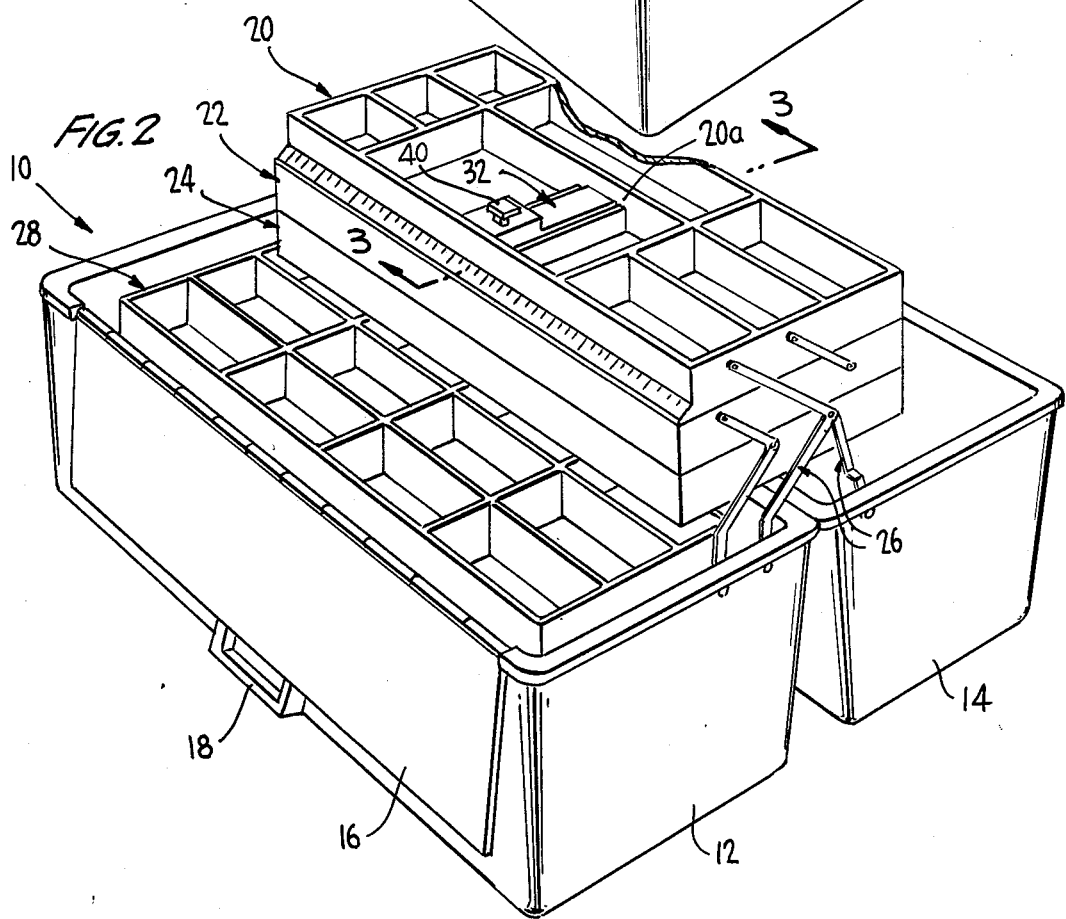
FIG. 2 is a view similar to FIG. 1 showing the tackle box in an open condition.

As shown in FIG. 1, a wall segment 14a of lid 14 is provided internally with an actuator 14b for switch 40 of the lighting fitting 32 received in tray 20. The location and configuration of actuator 40b is such that the actuator will depress switch 40 when the lid of the tackle box is closed as in FIG. 1, but will release switch 40 to activate the respective light bulb when the lid is opened as shown in FIGS. 2, 3 and 4. Accordingly, when the box is opened to the FIG. 2 position, tray 20 will be lit. Further, switch 40 of light fitting 32 in tray 24 is adapted to be depressed by the base wall of tray 20 when the box is closed and when the trays are stacked in the FIG. 2 configuration. However, when the trays are opened out manually as in FIG. 4, switch 40 of the lower light fitting is released upwardly so as to activate bulb 38 thereof and thereby light tray 24. It will be further evident that in the FIG. 4 position, the uppermost light bulb also illuminates tray 22 therebelow and the lower light bulb also illuminates the interior of base member 12 of the tackle box.

It will be appreciated from the foregoing that the lighting system of the present invention is extremely simplified as compared with that shown in the earlier patent referred to above and operates effectively and automatically when required. Moreover, the system has the facility unavailable in the earlier arrangement whereby the individual light fittings 32 can be removed if required and used independently as flashlights. Further, it will be evident that for daytime use, the respective switches 40 can be laterally shifted to the locked position illustrated in FIG. 6 thereby permanently deactivating the light bulbs and rendering the switch actuating mechanisms ineffective for operating same.

An alternative and preferred form of switch actuator 14c is shown in FIG. 7. This comprises a bowed and bent spring which is attached to wall 14a of lid 14 in place of actuator 14b. The purpose of the bowed spring 14c is to retain downward pressure on switch 40 even in the event that wall segment 14a is upwardly distorted, for example if the box is lifted under heavy load. Thus, in these circumstances, assurance is provided that switch 40 will not be released upwardly to activate bulb 38 when the box is closed. It is understood that boxes of this type generally have a hinged handle on the top of lid 14 which is not shown in the present drawings.

While only preferred embodiments of the invention have been described herein in detail, the invention is not limited thereby and modifications can be made within the scope of the attached claims.

We claim:

1. A portable lidded container having at least one internal tray having a base wall with an opening therein, a battery-operated lighting fitting having a light bulb, and means locating the fitting on the tray with the bulb light located in said opening so as to light a part of the container below the tray when the bulb is activated, the fitting having a plunger-type switch projecting upwardly therefrom for depression by a member of the container above the tray when the container is closed so as to deactivate the bulb, and for release by said member when the container is opened so as to activate the bulb, and said member of the container having switch actuating means for depressing and releasing the plunger switch as aforesaid, wherein the lighting fitting is a self-contained lighting fitting including a battery-receiving portion and circuitry for activating the light bulb, and locating means permits removal of the lighting fitting from the the tray for use of the lighting fitting separately as a flashlight, wherein the tray is compartmentalized, and the locating means comprises wall means defining a tray compartment, the lighting fitting being sized to fit in the compartment.

2. The container as defined in claim 1, wherein the tray is made of a plastic material capable of transmitting light therethrough by an edge lighting effect, and wherein the light bulb is located in plane with said base wall to light the tray by edge lighting when the bulb is activated.

3. The container as defined in claim 1, wherein the light bulb protrudes from a surface of the lighting fitting, and the opening in the base wall of the tray comprises a socket receiving the light bulb.

4. The container as defined in claim 1, wherein the plunger switch has a laterally offset inoperative position wherein the light bulb is deactivated and the actuating means is ineffective for operating the switch.

5. The container as defined in claim 1, wherein said member of the container is a lid element of the container.

6. The container as defined in claim 5, wherein the actuating means includes a spring element for maintaining downward pressure on the switch when the container lid is closed even if the lid is distorted upwardly.

7. The container as defined in claim 5, wherein said tray is a topmost tray of a plurality of trays which are interlinked by cantilever means for moving the trays between a stacked superposed position when the container is closed and a mutually opened out position when the container is opened, and wherein a lowermost tray is provided with a further and like battery-operated lighting fitting for lighting the lowermost tray and a container space therebelow when the container is opened, the further lighting fitting having an upwardly projecting plunger-type switch operated by one of said trays immediately above the lowermost tray.

8. A container as defined in claim 1, wherein said member of the container is a portion of a further tray above the switch which slides onto the switch to depress same when the container is closed and slides off the switch to release same when the container is opened.

9. A portable lidded container having at least one internal compartmentalized tray having a base wall with an opening therein, a self-contained battery-operated lighting fitting having a light bulb projecting from one surface thereof, battery receiving means, circuitry for activating the light bulb, and a plunger-type switch for operating the light bulb projecting from an opposite surface thereof, the switch being adapted to deactivate the light bulb when depressed and activate the light bulb when released, the lighting fitting being sized for removable receipt in a compartment of the tray which includes said opening in the base wall thereof for receiving the light bulb whereby the fitting can light a part of the container below the tray, and the container having an element above the tray including a switch actuating means for depressing the switch of the lighting fitting when the container is closed and releasing the switch when the container is opened, the lighting fitting being removable from the container for separate use as a flashlight.

10. The container as defined in claim 9, wherein the tray is made of a plastic material capable of transmitting light therethrough by an edge lighting effect, and wherein the light bulb is located in plane with said base wall to light the tray by edge lighting when the bulb is activated.

11. The container as defined in claim 9, wherein said element above the tray is a lid element of the container.

12. The container as defined in claim 11, wherein the switch actuating means includes a spring element for maintaining downward pressure on the switch when the lid is closed even if the lid is distorted upwardly.

13. The container as defined in claim 11, wherein said tray is an uppermost tray of a plurality of trays which are interlinked by cantilever means for moving the trays between a stacked superimposed position when the container is closed and a mutually opened out position when the container is opened.

14. The container as defined in claim 13, including a lowermost tray with a compartment having a base wall with a socket therein for receiving a light bulb of a further self-contained battery-operated lighting fitting and lighting the lowermost tray by edge lighting.

* * * * *